United States Patent
Bojinov et al.

(10) Patent No.: US 7,739,301 B2
(45) Date of Patent: Jun. 15, 2010

(54) METHOD AND APPARATUS FOR IMPROVING FILE SYSTEM PROXY PERFORMANCE AND SECURITY BY DISTRIBUTING INFORMATION TO CLIENTS VIA FILE HANDLES

(75) Inventors: Hristo Iankov Bojinov, Mountain View, CA (US); Hiroshi Ishii, Foster City, CA (US); Robert Paul Wood, San Mateo, CA (US); Serge Plotkin, Palo Alto, CA (US)

(73) Assignee: NetApp, Inc., Sunnyvale, CA (US)

( * ) Notice: Subject to any disclaimer, the term of this patent is extended or adjusted under 35 U.S.C. 154(b) by 728 days.

(21) Appl. No.: 10/803,788

(22) Filed: Mar. 17, 2004

(65) Prior Publication Data

US 2005/0210072 A1    Sep. 22, 2005

(51) Int. Cl.
G06F 7/00 (2006.01)
G06F 17/30 (2006.01)

(52) U.S. Cl. .............. 707/782; 707/783; 707/827; 709/230; 726/4

(58) Field of Classification Search .............. 707/8, 707/203, 10, 201, 1, 782, 827, 783; 709/229, 709/203, 249, 225, 213, 217, 237, 230; 713/201, 713/165, 153; 726/4
See application file for complete search history.

(56) References Cited

U.S. PATENT DOCUMENTS

| | | | |
|---|---|---|---|
| 6,324,581 B1 * | 11/2001 | Xu et al. ................. | 709/229 |
| 6,389,420 B1 * | 5/2002 | Vahalia et al. ................. | 1/1 |
| 6,931,450 B2 * | 8/2005 | Howard et al. ............... | 709/229 |
| 6,963,972 B1 * | 11/2005 | Chang et al. ................. | 713/153 |
| 6,993,661 B1 | 1/2006 | Garfinkel | |
| 7,225,207 B1 * | 5/2007 | Ohazama et al. ............. | 707/203 |
| 7,254,636 B1 * | 8/2007 | O'Toole et al. .............. | 709/230 |
| 7,319,979 B2 * | 1/2008 | Thomas et al. ................ | 705/26 |
| 2002/0078201 A1 * | 6/2002 | Gvily .......................... | 709/225 |
| 2002/0083191 A1 * | 6/2002 | Ryuutou et al. ............. | 709/237 |
| 2002/0191795 A1 * | 12/2002 | Wills ........................... | 380/270 |
| 2003/0115281 A1 * | 6/2003 | McHenry et al. ............ | 709/213 |
| 2003/0236857 A1 * | 12/2003 | Takase et al. ................. | 709/217 |
| 2004/0054777 A1 * | 3/2004 | Ackaouy et al. ............. | 709/225 |
| 2004/0123159 A1 * | 6/2004 | Kerstens et al. ............. | 713/202 |
| 2004/0162808 A1 * | 8/2004 | Margolus et al. ............... | 707/1 |
| 2004/0255048 A1 * | 12/2004 | Lev Ran et al. ............. | 709/249 |
| 2005/0033988 A1 * | 2/2005 | Chandrashekhar et al. .. | 713/201 |
| 2005/0091487 A1 * | 4/2005 | Cross et al. ................. | 713/165 |

OTHER PUBLICATIONS

Callaghan et al., "NFS Version 3 Protocol Specification", Network Working Group Request for Comments (RFC) 1813, Jun. 1995, 118 pages.

* cited by examiner

*Primary Examiner*—John E Breene
*Assistant Examiner*—Giovanna Colan
(74) *Attorney, Agent, or Firm*—Cesari and McKenna, LLP

(57) ABSTRACT

The preferred embodiment of the invention distributes, and effectively caches, information by inserting it into file handles that the proxy sends to clients. This information can be used to improve performance by eliminating the need for the proxy to generate additional requests to the server to establish file identity. The distributed information can also be intended to improve security, for example, by allowing the proxy to encode into the file handle a session key that expires after some amount of time.

43 Claims, 1 Drawing Sheet

METHOD AND APPARATUS FOR IMPROVING FILE SYSTEM PROXY PERFORMANCE AND SECURITY BY DISTRIBUTING INFORMATION TO CLIENTS VIA FILE HANDLES

BACKGROUND OF THE INVENTION

1. Technical Field

The invention relates to file systems. More particularly, the invention relates to a method and apparatus for improving file system proxy performance and security by distributing information to clients via file handles.

2. Description of the Prior Art

The Network File System (NFS), developed by Sun Microsystems, is the de facto standard for file sharing among UN*X hosts. NFS Version 3 is documented in RFC 1813. NFS is a stateless protocol. This means that the file server stores no per-client information, and there are no NFS connections. For example, NFS has no operation to open a file because this would require the server to store state information, e.g. that a file is open, what its file descriptor is, the next byte to read, etc. Instead, NFS supports a lookup procedure, which converts a filename into a file handle. This file handle is a unique, immutable identifier, usually an i-node number, or disk block address. NFS does have a read procedure, but the client must specify a file handle and starting offset for every call to read. Two identical calls to read yield the exact same results. If the client wants to read further in the file, it must call read with a larger offset.

A software program or appliance that is a proxy for the NFS protocol, or any other protocol that uses server-generated file handles, usually requires additional file metadata information to be stored either on the server or locally on the proxy, especially in the case of encrypting or authenticating client data, and also in the case of server virtualization, i.e. when serving as a single access point for clients, while providing them with access to several servers on the back end. This metadata can be used, for example, to apply different encryption keys, or to enforce access restrictions to files that are located in different logical units that are defined on the proxy, but possibly invisible to the file server.

Storage encryption appliances that secure data on NFS file servers are an example of a device that matches the above characteristics. Such an appliance forwards file handles generated by the file server to clients, and subsequently acts as a proxy for client requests for access to the file system on the server. Given a file handle from a client, the appliance needs to establish to what area (a.k.a. storage vault) the file belongs, and use the appropriate keys to encrypt or decrypt data. If the metadata used to establish this are not available on the proxy, as is typically the case with large file sets accessed by many client machines, the proxy must send additional requests to the file server to determine how to handle the client request correctly.

It would be advantageous to provide a mechanism that distributes, and effectively caches, information by inserting it into file handles that the proxy sends to clients. It would also be advantageous to provide a mechanism that improves performance by eliminating the need for the proxy to generate additional requests to the server to establish file identity.

SUMMARY OF THE INVENTION

The preferred embodiment of the invention distributes, and effectively caches, information by inserting it into file handles that the proxy sends to clients. This information can be used to improve performance by eliminating the need for the proxy to generate additional requests to the server to establish file identity. The distributed information can also be intended to improve security, for example, by allowing the proxy to encode into the file handle a session key that expires after some amount of time.

DETAILED DESCRIPTION OF THE INVENTION

Figure 1:
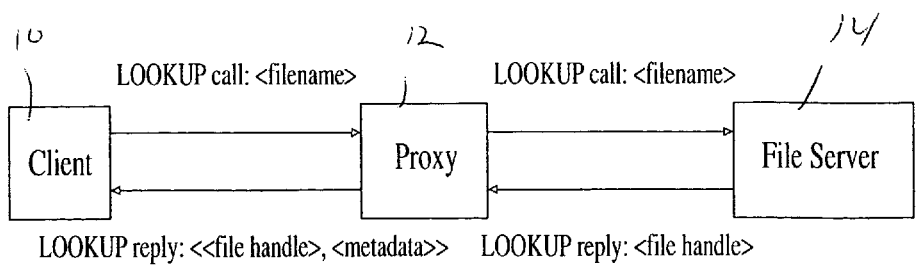
FIG. 1 is a block schematic diagram that shows how a proxy appliance or software program can distribute information in client file handles according to the invention.

A proxy that is logically, i.e. in terms of data flow, located between clients and servers in general must remember certain information about the handles, or generally object identifiers, issued by a specific server to a specific client. For example, if the proxy serves more than one server, the proxy must remember which server issued a specific handle. This is necessary because the server name is not necessarily mentioned in future access by the client, One approach is to keep a table inside the proxy. One disadvantage of doing so is the size of the table and the fact that this table might be lost if the proxy is rebooted. Saving such a table in a battery-backed RAM or some other non-volatile storage is possible, but expensive in terms of performance, cost, or both.

The preferred embodiment of the invention modifies the handle returned to the client. When the client asks the server to issue a handle, the handle is intercepted, and instead of returning the handles to the client as-is, additional information is encoded into the handle. Examples of such additional information include server name/ID, time, temporary session key, other cryptographic information, etc. One advantage of such application is that there is no need to keep a table in the proxy.

The preferred embodiment of the invention distributes, and effectively caches, information by inserting it into file handles that the proxy sends to clients. Information can be inserted into file handles in any of various ways. If the file handles are of a variable size, then additional bytes can be inserted at the beginning, at the end, or in any other possible way, and the size field can be updated to reflect the larger size. If file handles have a fixed size, there are other approaches that can be used. For example, some file servers do not use the full size of file handles and in this case the proxy can use the available space to store information before sending the file handles to clients.

This information can be used to improve performance by eliminating the need for the proxy to generate additional requests to the server to establish file identity. Performance improvements can be achieved by storing information, such as a key ID or some other type of metadata, in the file handle, and thus avoiding having to send additional requests to the file server when the file handle is used. The distributed information can also be intended to improve security, for example, by allowing the proxy to encode into the file handle a session key that expires after some amount of time, and/or to sign the file handle contents so that clients can not tamper with it. By implementing a session key in file handles, it is possible to require that at certain intervals, for example intervals in time or in usage, clients establish a session by using a client-side application that requires stronger authentication than that allowed by the plain storage protocol. For instance, the typical method of authenticating clients in the NFS protocol is to trust the user ID (UID) sent by the client machine, which is a very weak form of authentication. A more advanced form of authentication can be enforced by using an alternative program that mounts NFS exports and then embeds a session ID into the root file handles of those exports. Based on this session, the proxy can add data representing the session ID to each subsequently derived file handle. If the session expires under certain conditions, the client must authenticate again to access any data from the file server.

FIG. 1 is a block schematic diagram that shows how a proxy appliance or software program can distribute information in client file handles according to the invention. The presently preferred embodiment of the invention uses file handles sent to clients 10 by a proxy 12 to store information that is relevant to those file handles and the possible operations that can be executed with them. In this way, even long after the proxy has lost track of a specific file handle, e.g. because of limited memory, whenever the client that has the file handle requests an operation with it, for example, to WRITE a block of data to a file server 14, the necessary metadata are immediately available to the proxy from that same client file handle.

As shown FIG. 1, the client requests a file <filename> from the file server via the proxy using a LOOKUP call:<filename> which is passed via the proxy to the file server. The file server returns a LOOKUP reply:<file handle> to the proxy. The invention herein disclosed provides a mechanism by which the proxy inserts <metadata> into the file server's response to the client request and returns a LOOKUP reply: <<file handle>,<metadata> to the client. For example, in NFS version 3, if the file server returns a file handle of length 32 bytes, there are 32 more bytes available for inserting metadata. The file handle data from the server can be appended to that metadata, and the file handle size can be set to the sum of the length of the server file handle and the length of the proxy metadata. Alternatively, the client file handle can be obtained by combining the server file handle and the proxy metadata in some other way possibly, but not necessarily, involving cryptographic and/or compression transforms; or the file server file handle can be replaced completely.

Figure 2:
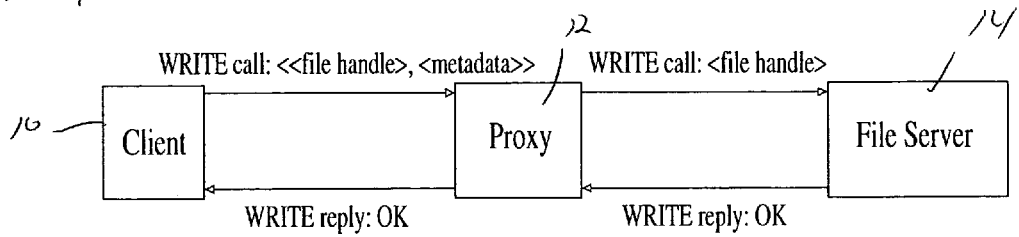
FIG. 2 is a block schematic diagram that shows how a proxy appliance or software program uses the information in client file handles when it receives a request from a client according to the invention.

FIG. 2 is a block schematic diagram that shows how a proxy appliance or software program uses the information in client file handles, e.g. WRITE:call<<file handle>, <metadata>, when it receives a request from a client according to the invention. The real file handle that is sent to the server then is the client file handle <file handle> without the metadata <metadata> that is only intelligible to the proxy. The metadata <metadata> serves its purpose by making it possible to handle the client request appropriately on the proxy, for example, by using the appropriate cryptographic keys to transform the data in the request or reply, or even by helping determine which server the request is ultimately intended for in the case of virtualization.

Figure 3:
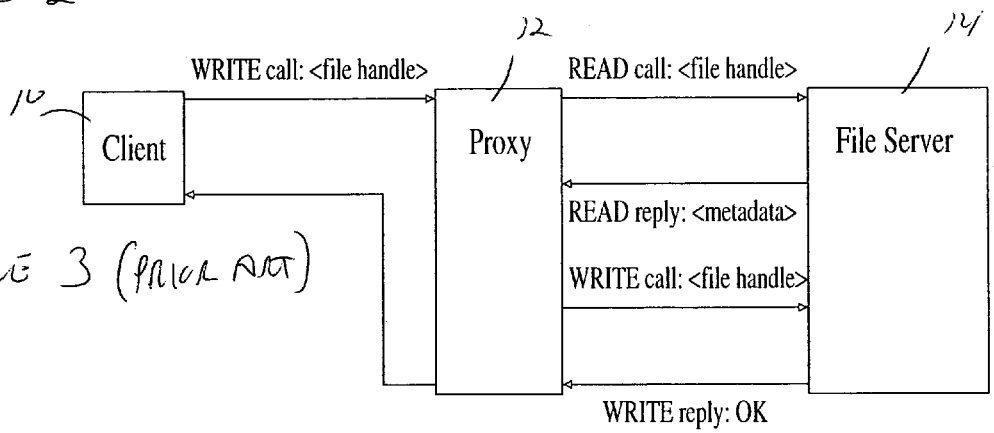
FIG. 3 is block schematic diagram that shows the additional operations that must be executed if the information is missing from the file handle.

FIG. 3 is block schematic diagram that shows the additional operations that must be executed if file identity information is missing from the file handle. It can be seen when contrasting the example of FIG. 3, which shows the state of the art, with that of FIG. 2 that the WRITE call:<file handle> operation is streamlined when using the approach disclosed herein (FIG. 2) because file identity information is contained within the <metadata>, which is a part of the file handle. However, the state of the art approach requires an additional exchange between the proxy and the file server, i.e. READ: call<file handle> and READ reply:<metadata>, to establish file identity before the WRITE call:<file handle> operation may be performed.

Although the invention is described herein with reference to the preferred embodiment, one skilled in the art will readily appreciate that other applications may be substituted for those set forth herein without departing from the spirit and scope of the present invention.

For example, invention may be practiced with any protocols that allocate a handle or, in general, an identifier to each new storage object, e.g. a file, and require that further accesses to this object include this handle/ID instead of the name. Such protocols may be stateless or statefull. Further, the handle may be modified or supplanted entirely by metadata.

Accordingly, the invention should only be limited by the claims included below.

The invention claimed is:

1. A method for establishing identity in a file system, comprising:

receiving, from a client, a first Network File System (NFS) operation concerning an indicated file, the first NFS operation received by a proxy;

forwarding the first NFS operation from the proxy to be received by a file server;

returning a NFS file handle associated with the first NFS operation from the file server to the proxy in response to the file server receiving the first NFS operation from the proxy;

inserting, by the proxy, metadata into the NFS file handle in response to receiving the NFS file handle from the file server, wherein the metadata is an encryption key;

sending, by the proxy in response to receiving the NFS file handle from the file server, the NFS file handle with the metadata inserted in the NFS file handle to the client as a reply to the first NFS operation;

using, by the client, the metadata and the NFS file handle in a second NFS operation to identify the client and the indicated file; and receiving, from the client, the second NFS operation by the proxy, the second NFS operation comprising the metadata sent with the second NFS operation;

identifying, in response to the metadata, the client as having a permission to submit the second NFS operation;

sending the second NFS operation to the file server and not sending the metadata to the file server; and receiving, by the proxy, a further NFS reply from the file server, and sending, by the proxy, the further NFS reply to the client.

2. The method of claim 1, whereby using the metadata in the NFS file handle eliminates a need for the proxy to generate additional requests to the file server to establish file identity, and for completing client requests.

3. The method of claim 1, further comprising:

encoding metadata in a form of a session key into the file handle, the session key expiring after a predetermined amount of time.

4. The method of claim 1, further comprising:

using an NFS file system as the file system.

5. The method of claim 1, further comprising:

using a stateless protocol by the file system.

6. The method of claim 1, wherein the NFS file handle is of a variable size.

7. A method for establishing identity in a file system, comprising:
- receiving a first file request concerning an indicated file from a client, the first file request received by a proxy;
- forwarding the first file request from the proxy to a file server;
- returning a reply associated with the first file request from the file server to the proxy, wherein the reply includes a file handle associated with the indicated file;
- inserting, by the proxy, metadata into the file handle;
- sending, by the proxy, the file handle with the metadata inserted in the file handle to the client, the metadata to be used in further requests to identify the client as having a permission to access the indicated file;
- receiving, from the client, a second file request by the proxy, the second file request including the metadata in a second file handle sent with the second file request;
- identifying, in response to the metadata, that the client has the permission to submit the second file request;
- sending the second file request to the file server and not sending the metadata with the second file handle to the file server; and
- receiving by the proxy a second reply from the file server, and sending by the proxy the second reply to the client.

8. An apparatus to establish identity in a file system, comprising:
- a proxy configured to receive a first Network File System (NFS) operation concerning an indicated file sent by a client to the file system, the proxy further configured to forward the first NFS operation to be received by a file server;
- the file server configured to return a NFS file handle associated with the first NFS operation to the proxy in response to the file server receiving the first NFS operation from the proxy;
- the proxy further configured to insert metadata into the NFS file handle in response to receiving the NFS file handle from the file server, wherein the metadata is an encryption key;
- the proxy further configured to send the NFS file handle with the metadata inserted in the NFS file handle to the client as a reply to the first NFS operation, the metadata and the NFS file handle to be used in a second NFS operation to identify the client and the indicated file;
- the proxy further configured to receive, by the client, a second NFS operation, the second NFS operation comprising the metadata in the second NFS file handle sent with the second NFS operation;
- the proxy to identify, in response to the metadata, the client as having a permission to submit the second NFS operation;
- the proxy to send the second NFS operation to the file server and not to send the metadata with the second NFS file handle to the file server; and
- the proxy to receive a second NFS reply from the file server, and the proxy to send the second NFS reply to the client.

9. The apparatus of claim 8, whereby using the metadata in the NFS file handle eliminates a need for the proxy to generate additional requests to the file server to complete client requests.

10. The apparatus of claim 8, further comprising:
the proxy to use the metadata in the NFS file handle received from the client to eliminate a need for additional communication with the file server to establish file identity.

11. The apparatus of claim 8, further comprising:
the proxy to encode the metadata in a form of a session key into the NFS file handle, the session key expiring after a predetermined amount of time.

12. The apparatus of claim 8, further comprising:
an NFS file system used as the file system.

13. The apparatus of claim 8, further comprising:
a stateless protocol used by the file system.

14. A non-volatile memory executed on a computer, comprising:
- the non-volatile memory containing procedures for execution on the computer for a method of establishing identity in a file system, the method having the steps of,
- receiving, from a client, an operation concerning an indicated file, the operation received by a proxy;
- forwarding the operation from the proxy to be received by a file server;
- returning a file handle associated with the first operation from the file server to the proxy in response to the file server receiving the operation from the proxy;
- inserting, by the proxy, metadata into the file handle in response to receiving the file handle from the file server, wherein the metadata is an encryption key;
- sending, by the proxy in response to receiving the file handle from the file server, the file handle with the metadata inserted in the file handle to the client as a reply to the operation;
- receiving, from the client, a second file request by the proxy, the second file request comprising the metadata in a second file handle sent with the second file request;
- identifying, in response to the metadata, that the client has permission to submit the second file request;
- sending the second file request to the file server and not sending the metadata with the second file handle to the file server; and
- receiving, by the proxy, a second reply from the file server, and sending by the proxy the second reply to the client.

15. A method for establishing identity in a file system, comprising:
- receiving a first file request concerning an indicated file from a client, the first file request received by a proxy;
- forwarding the first file request from the proxy to a file server;
- granting a permission for the request to be acted upon by the file system in response to a predetermined protocol;
- returning a reply associated with the first file request from the file server to the proxy, wherein the reply includes a file handle associated with the indicated file;
- inserting, by the proxy, a session key into the file handle;
- sending, by the proxy, the file handle with the session key inserted in the file handle to the client, the session key to be used in further requests to identify the client and the indicated file;
- receiving, from the client, a second file request by the proxy, the second file request comprising information from the session key in a second file handle sent with the second file request;
- identifying, in response to the session key, that the client has permission to submit the second file request;
- sending the second file request to the file server and not sending the session key with the second file handle to the file server; and
- receiving, by the proxy, a second reply from the file server, and sending by the proxy the second reply to the client.

16. The non-volatile memory of claim 14, whereby using the metadata in the file handle eliminates a need for the proxy to generate additional requests to the file server to establish file identity.

17. The non-volatile memory of claim 16, further comprising:
causing the session key to expire after a selected amount of time.

18. The non-volatile memory of claim 16, further comprising:
causing the session key to expire after a selected amount of usage.

19. The non-volatile memory of claim 14, further comprising:
using a NFS file server as the file server.

20. The non-volatile memory of claim 14, further comprising:
using a two way communication exchange between the proxy and the file server.

21. An apparatus to establish identity in a file system, comprising:
a proxy to receive a file request sent by a client to the file system, the proxy to forward the request to a file server;
the file server to return a reply associated with the file request to the proxy, wherein the reply includes a file handle;
the proxy to insert a session key into the file handle;
the proxy to send the file handle with the session key inserted in the file handle to the client, the session key to be used in further requests to identify the client and the indicated file;
the proxy to receive, by the client, a second file request, the second file request to include information of the session key in a further file handle sent with the second request;
the proxy to identify, in response to the information of the session key, the client as having a permission to submit the another file request;
the proxy to send the second request to the file server and not to send the session key with the second file handle to the file server; and
the proxy to receive a further reply from the file server, and the proxy to send the further reply to the client.

22. The apparatus as in claim 21, whereby using the session key in the file handle eliminates a need for the proxy to generate additional requests to the file server to establish file identity.

23. The apparatus of claim 21, wherein
the file handle is a Network File System (NFS) file handle.

24. The apparatus of claim 21, further comprising:
the proxy to encode the metadata in a form of a session key into the file handle, the session key expiring after a predetermined amount of time.

25. The apparatus of claim 21, further comprising:
an NFS file system used as the file system.

26. The apparatus of claim 21, further comprising:
a stateless protocol used by the file system.

27. An apparatus to establish identity in a file system, comprising:
a proxy configured to receive a first file request sent by a client to the file system, the proxy further configured to forward the first file request to a file server;
the file server configured to return a reply associated with the first file request to the proxy;
the proxy further configured to insert a session key into a file handle;
the proxy further configured to send the file handle with the session key inserted in the file handle to the client, the session key configured to be used in a second file request to identify the client and the indicated file;
the proxy further configured to receive, by the client, a second file request, the second file request configured to include the session key in a second file handle sent with the second file request;
the proxy further configured to identify, in response to the session key, the client as having a permission to submit the second file request;
the proxy further configured to send the second file request to the file server and not to send the session key with the second file handle to the file server; and
the proxy further configured to receive a second reply from the file server, and the proxy further configured to send the second reply to the client.

28. A method for establishing identity in a file system, comprising:
receiving a first file request concerning an indicated file from a client, the first file request received by a proxy;
forwarding the first file request from the proxy to a file server;
determining that the client has a permission to have the request acted upon by the file system in response to a predetermined protocol;
returning a reply associated with the first file request from the file server to the proxy, wherein the reply includes a file handle associated with the indicated file;
inserting, by the proxy, a cryptographic information into the file handle
sending, by the proxy, the file handle with the cryptographic information inserted in the file handle to the client, the cryptographic information to be used in one or more requests to identify the client and the indicated file;
receiving, by the client, a second file request by the proxy, the second file request including the cryptographic information in a second file handle sent with the second file request;
identifying, in response to the cryptographic information, that the client has the permission to submit the second file request;
sending the second file request to the file server and not sending the cryptographic information with the second file handle to the file server; and
receiving, by the proxy, a second reply from the file server, and sending by the proxy the second reply to the client.

29. The method according to claim 28, whereby using the cryptographic information in the file handle eliminates a need for the proxy to generate additional requests to the file server to establish file identity.

30. The method according to claim 28, further comprising:
causing the cryptographic information to expire after a selected amount of time.

31. The method according to claim 28, further comprising:
causing the cryptographic information to expire after a selected amount of usage.

32. The method according to claim 28, further comprising:
using a NFS protocol as the predetermined protocol.

33. The method according to claim 28, further comprising:
using as the predetermined protocol a two way communication exchange between the proxy and the file server.

34. An apparatus to establish identity in a file system, comprising:
a proxy configured to receive a file request for an indicated file sent by a client to the file system, the proxy further configured to forward the request to a file server;

the file server configured to return a reply associated with the file request to the proxy, wherein the reply is configured to include a file handle;

the proxy further configured to insert a cryptographic information into the file handle;

the proxy further configured to send the file handle with the cryptographic information inserted in the file handle to the client, the cryptographic information configured to be used in further requests to identify the client and the indicated file;

the proxy further configured to receive, by the client, a second request, the second file request to include the cryptographic information in a second file handle sent with the second request;

the proxy further configured to identify, in response to the cryptographic information, the client as having a permission to submit the second file request;

the proxy further configured to send the second request to the file server and not to send the cryptographic information with the second file handle to the file server; and the proxy further configured to receive a further reply from the file server, and the proxy to send the further reply to the client.

35. The apparatus as in claim 34, whereby using the cryptographic information in the file handle eliminates a need for the proxy to generate additional requests to the file server to establish file identity.

36. The apparatus of claim 34, wherein
the file handle is a Network File System (NFS) file handle.

37. The apparatus of claim 34, further comprising:
the proxy further configured to encode the metadata in a form of a cryptographic information into the file handle, the cryptographic information configured to expire after a predetermined amount of time.

38. The apparatus of claim 34, further comprising:
an NFS file system used as the file system.

39. The apparatus of claim 34, further comprising:
a stateless protocol used by the file system.

40. An apparatus to establish identity in a file system, comprising:

a proxy configured to receive a first file request sent by a client to the file system, the proxy to forward the first file request to a file server;

the file server configured to return a reply associated with the first file request to the proxy;

the proxy further configured to insert a cryptographic information into a file handle;

the proxy further configured to send the file handle with the cryptographic information inserted in the file handle to the client, the cryptographic information configured to be used in a second file request to identify the client and the indicated file;

the proxy further configured to receive, by the client, a second file request, the second file request configured to include the cryptographic information in a second file handle sent with the second file request;

the proxy further configured to identify, in response to the cryptographic information, the client as having a permission to submit the second file request;

the proxy further configured to send the second file request to the file server and not to send the cryptographic information with the second file handle to the file server; and the proxy further configured to receive a second reply from the file server, and the proxy to send the second reply to the client.

41. A method for establishing identity in a file system, comprising:

receiving a file request concerning an indicated file from a client, the request received by a proxy;

forwarding the request from the proxy to a file server;

returning a reply associated with the file request from the file server to the proxy, wherein the reply includes a file handle associated with the indicated file;

inserting, by the proxy, metadata into the file handle;

sending, by the proxy, the file handle with the metadata inserted in the file handle to the client, a size of the file handle set to a sum of a length of the server file handle and a length of the proxy metadata, the metadata to be used in further requests to identify the client and the indicated file; and receiving, from the client, a second file request by the proxy, the second file request comprising the metadata in a second file handle sent with the second file request;

identifying, in response to the metadata, that the client has permission to submit the second file request;

sending the second file request to the file server and not sending the metadata with the second file handle to the file server; and receiving by the proxy a second reply from the file server, and sending by the proxy the second reply to the client.

42. A method, comprising:

receiving, by a proxy, a file request for a file sent from a client;

forwarding the file request from the proxy to a file server;

returning a reply associated with the file request from the file server to the proxy, wherein the reply includes a file handle;

inserting, by the proxy, metadata into the file handle;

sending, by the proxy, the file handle with the metadata inserted in the file handle to the client;

receiving, from the client, a second file request by the proxy, the second file request comprising the metadata in a second file handle sent with the second file request;

identifying, in response to the metadata, that the client has permission to submit the second file request;

sending the second file request to the file server and not sending the metadata with the second file handle to the file server; and receiving by the proxy a second reply from the file server, and sending by the proxy the second reply to the client.

43. A computer apparatus, comprising:

a proxy configured to receive a client file request for a file and forward the file request from the proxy to a file server;

the server configured to return a reply associated with the file request, wherein the reply includes a file handle;

the proxy further configured to intercept the file handle sent from the server and insert metadata into the file handle to create a modified file handle;

the proxy further configured to send the modified file handle with the metadata inserted in the file handle to the client;

the proxy further configured to receive the modified file handle from the client for a second file request for the file, wherein the proxy is further configured to use the modified file handle to eliminate a need for the proxy to generate one or more additional requests to the server that would be required to access the file if the modified file handle did not include the inserted metadata;

the proxy further configured to receive, by the client, a second file request, the second file request configured to include the metadata in a second file handle sent with the second file request;

the proxy further configured to identify, in response to the metadata, the client as having a permission to submit the second file request;

the proxy further configured to send the second file request to the file server and not to send the metadata with the second file handle to the file server; and the proxy further configured to receive a second reply from the file server, and the proxy to send the second reply to the client.

* * * * *